United States Patent [19]

Albouy

[11] Patent Number: 4,540,853
[45] Date of Patent: Sep. 10, 1985

[54] APPARATUS FOR DETECTING A LOOP DURING RINGING

[75] Inventor: Pierre Albouy, Lannion, France

[73] Assignee: Compagnie Industrielle des Telecommunications Cit-Alcatel, Paris, France

[21] Appl. No.: 516,010

[22] Filed: Jul. 21, 1983

[30] Foreign Application Priority Data

Jul. 30, 1982 [FR] France .................. 82 13321

[51] Int. Cl.³ ............................................. H04M 3/04
[52] U.S. Cl. ........................ 179/18 FA; 179/18 HB; 179/84 A
[58] Field of Search .......... 179/18 HB, 18 FA, 84 R, 179/84 A

[56] References Cited

U.S. PATENT DOCUMENTS

| | | | |
|---|---|---|---|
| 3,746,798 | 8/1974 | Thomas | 179/18 HB |
| 3,829,619 | 7/1973 | Close et al. | 179/18 HB |
| 4,110,569 | 8/1978 | Schindler et al. | 179/84 A |
| 4,132,864 | 1/1979 | Feng | 179/18 FA |
| 4,355,206 | 10/1982 | Israel et al. | 179/18 HB |
| 4,356,355 | 10/1982 | Ferrieu et al. | 179/18 HB |
| 4,396,805 | 8/1983 | Wagner | 179/18 FA |

FOREIGN PATENT DOCUMENTS

0094162 11/1983 Canada .

Primary Examiner—Gene Z. Rubinson
Assistant Examiner—Elio DiVito
Attorney, Agent, or Firm—Sughrue, Mion, Zinn, Macpeak and Seas

[57] ABSTRACT

The apparatus comprises a zero pass detector (2) for detecting zero passes in a voltage signal proportional to the line current to generate a pulse signal constituted by positive and negative rectangular pulses of equal amplitude and of width dependant on the duty ratio of the line signal, a pulse signal processor constituted by a saturable integrator circuit (4) connected to integrate the pulse signal and to deliver a triangular signal having a positive peak value which increases after ringing has been answered, a comparator (6) connected to compare the triangular signal with a positive reference voltage (+Vr) and to deliver a loop detected signal when the peak value reaches the reference value, the loop detected signal being applied to a bistable logic device (8) which serves to store the loop detected signal and to deliver an output signal from the apparatus based on the stored signal.

6 Claims, 8 Drawing Figures

APPARATUS FOR DETECTING A LOOP DURING RINGING

The invention relates to detecting a subscriber loop during ringing.

BACKGROUND OF THE INVENTION

During ringing, it is necessary that telephone systems should be capable of detecting when the ringing telephone is taken off-hook, i.e. when it is answered, and this detection must take place as rapidly and as reliably as possible.

Generally speaking a looped subscriber line must be detected regardless of whether the subscriber is making a call or receiving a call. When the subscriber is making a call, loop detection is not much of a problem, however the same is not true for a called subscriber, i.e. when a subscriber unhooks a ringing telephone. In current telephone systems, a direct voltage is superposed on the ringing waveform, and the loop is detected by virtue of a direct current (DC) component which flows when the telephone is taken off-hook. Such detection becomes very difficult when the alternating current (AC) in the line due to the AC component of the ringing current is considerably greater than the DC component to be detected. Further, the wide variety of line impedances and ringing impedances makes it necessary to design worst case telephone systems which are generally not optimum in performance for the majority of telephone installations.

A subscriber is connected to a telephone exchange by a line of resistance RL and the ringer is connected to the terminals of the line. From an electrical point of view the ringer can be approximated by a resistance Rs connected in series with a capacitance Cs. Likewise across the terminals of the line, and thus in parallel with the ringer, there is the remainder of the subscriber station which from an electrical point of view is equivalent to a resistance Rt connected in series with a switch K, where the switch represents the gravity-operated hookswitch of the telephone set. The line is supplied with power by a DC generator which delivers a direct voltage of 48 volts in most cases. A ringing source constituted by an AC generator supplies the line with an r.m.s. voltage of 80 volts for example and is connected in series with the DC generator. In the on-hook mode, i.e. for a called subscriber, only the AC generator causes a current to flow and the value of the current is determined by the line resistance RL and by the ringer impedance, i.e. the resistance Rs and the capacitance Cs in series. In off-hook mode, i.e. once the subscriber has taken his telephone off hook, the DC generator delivers direct current at a value which is determined by the resistances RL and Rt, and the AC generator delivers a current which is determined by the resistance of the line RL in series with an impedance constituted by the resistance Rt in parallel with the impedance of the ringer, and thus in parallel on the series connection of the resistance Rs and the capacitance Cs. The line current in off-hook mode thus comprises a DC component and an AC component. Except in special cases, the ratio of these components is generally different from the ratio of the voltages supplied by the two generators.

Conventional systems for detecting a loop during ringing consist in detecting the DC component of the line current.

One circuit of this type comprises a resistance bridge having two resistances in series with each wire of the line, each of which constitutes one arm of the bridge. The other two arms of the bridge are each constituted by two resistances in series and the mid-point of each of these two arms is connected to a differential amplifier which delivers an output voltage proportional to the instantaneous transverse current in the line. It is not easy to detect a loop directly from this signal by comparing it with a detection threshold since the amplitude of the AC component in the signal is much larger than the threshold. Thus, before the telephone is taken off-hook the line current has no DC component but only an AC component generated by the AC generator such that the signal delivered by the differential amplifier only includes an AC component and goes larger than the threshold during each positive half cycle of the AC component. After the telephone is taken off-hook, the line current includes a DC component together with the AC component so long as ringing continues, i.e. so long as the AC generator applies ringing current to the line. The signal delivered by the differential amplifier thus includes a DC component and an AC component whose amplitude is such that it drops below the threshold during the negative half cycles thereof. This requires the signal to be filtered in such a manner as to attenuate the AC component and this must be done well enough to ensure that its amplitude always remains below the detection threshold before the telephone goes off-hook and that its amplitude after the telephone goes off-hook is never so great as to bring the signal back below the threshold during negative half cycles.

The signal from the amplifier is thus filtered by a filter comprising a resistance R and a capacitance C before being applied to the input of a comparator whose other input receives the detection threshold. The RC time constant of the filter is designed for the worst case, i.e. for the case of a short line on which the AC ringing current is of maximum amplitude since the line resistance is low. In this case the observed time constant is about 80 milliseconds and, in practice, in order to retain a safety margin, a value of 100 milliseconds is adopted. Under such conditions the worst case for detecting a loop during ringing becomes a long line of high resistance since the DC component in the line is small, being about 20 milliamps. The AC ringing current in the line is smaller than in the case of a short line and the signal at the output of the amplifier as applied to the filter includes a smaller AC component than it does in the short line case. At the output from the filter the AC component of the signal applied to the comparator is small relative to the DC component and it may be ignored. Under such conditions using a detection threshold corresponding to a line current of 10 milliamps, the loop detection time Td is about 70 milliseconds.

In electronic junctors, it is advantageous for reasons of dissipation and technology to reduce the supply voltages as much as possible. If the electronic junctor generates the ringing current, the DC voltage is reduced since it is not possible to reduce the AC ringing voltage very much and in some types of electronic junctor the AC generator operates at 60 volts r.m.s. for the ringing current while a DC generator operates at 12 volts for powering the subscriber's telephone. Under such conditions, detecting a loop during ringing becomes even more difficult. The filter time constant increases from about 80 to about 250 milliseconds, and the detection time increases considerably and approaches the standard maximum laid down by Telephone Administrations which is about 250 milliseconds.

Generally speaking the detection system must be designed for the worst case in which the amplitude of the AC component in the line current is greatest. In this case an electronic junctor operating with a 12 volt DC generator suffers from increased difficulty because of the reduced ratio between the DC and the AC components.

Account must also be taken of the fact that a subscriber line is subjected to all kinds of external interference, and the only protection against such interfering signals consists in providing the loop detection apparatus with a safety margin between the amplitude of the AC component after filtering and the detection threshold. This leads inevitably to an increased detection time, and the greater the desired immunity to external interference, the greater the detection time.

With an electronic junctor, and in particular with a junctor using a 12 volt DC generator, the safety margin has to be reduced to a minimum if performance is not to suffer.

Preferred embodiments of the present invention mitigate the difficulties of detecting a loop during ringing, particularly in the case of electronic junctors, and makes it possible for the loop to be detected with an adequate safety margin in the presence of external interference on the line.

SUMMARY OF THE INVENTION

The present invention provides apparatus for detecting a loop during ringing, the apparatus comprising zero pass detector means for detecting zero passes in a voltage signal proportional to the line current to generate a pulse signal constituted by positive and negative rectangular pulses of equal amplitude and of width dependant on the duty ratio of the line signal, pulse signal processing means, and storage means for storing a signal delivered by the processing means, the improvement wherein the processing means are constituted by a saturable integrator circuit delivering a triangular signal having a positive peak value which increases after ringing has been answered, and a comparator connected to compare the triangular signal with a reference voltage and to deliver a signal to the storage means when a called subscriber answers.

BRIEF DESCRIPTION OF THE DRAWINGS

Embodiments of the invention are described by way of example with reference to the accompanying drawings, in which.

MORE DETAILED DESCRIPTION

The apparatus for detecting a loop during ringing in accordance with the invention is based on the fact that the cyclic or duty ratio of the line current changes when the called subscriber lifts his telephone off-hook, whereas up to now known apparatuses for detecting a loop during ringing have been used on the level of the DC component in the line when answered.

The duty ratio of the line current will therefore be calculated both before and after the called subscriber answers for the worst possible case in order to determine the conditions in which loop detection must be performed in order to provide good security, particularly in the case of electronic junctors.

Before answering, and while there is an AC ringing current on the line, the current is practically sinusoidal and has no DC component. Let T be the duration of the ringing current period which has positive and negative half cycles of duration T/2. The duty ratio is equal to the ratio of the period T/2 of one positive half cycle divided by the duration T of one complete cycle. The duty ratio is thus equal to $\frac{1}{2}$. Before answering, the line resistance RL is in series with the ringer, i.e. in series with the ringer resistance Rs and in series with the ringer capacitance Cs.

On going off-hook when the subscriber answers his telephone, the line resistance RL is in series with a circuit constituted by a parallel connection of the telephone resistance Rt connected in parallel with the series connection of the ringer resistance Rs and the ringer capacitance Cs. The resulting impedances are thus as follows: for the DC component of the current $Zc = RL + Rt$ while for the AC component of the current:

$$|Za| = \sqrt{\frac{[2\pi F \cdot Cs \cdot RL(Rt+Rs)+Rt \cdot Rs]^2 + (RL+Rt)^2}{2\pi F \cdot Cs(Rt+Rs)^2 + 1}} \quad (1)$$

where F is the frequency of the ringing current.

The best case for detecting the loop is when the ratio of the DC impedance $|Zc|$ divided by the AC impedance $|Za|$ is equal to 1, while the most unfavourable case is when the ratio is greater which happens when Rc tends to zero which is often the case in practice. The most unfavorable case is obtained for a high value of the DC impedance $|Zc|$ with the smallest possible value for the AC impedance $|Za|$.

If the line resistance RL tends to zero, and if Rt is taken to be equal to 2000 ohms, with a ringing resistance Rs equal to 1000 ohms and a ringing capacitance Cs equal to 2 microfarads, the equivalent resistance $|Za|$ for the AC source is 1107 ohms at a frequency of 50 Hz.

Putting the DC supply voltage to the line as Vc and putting the r.m.s. voltage of the ringing source as Va, the current I in the line after the telephone has been taken off-hook is given by the equation:

$$I = \frac{Vc}{Zc} + \frac{Va}{|Za|} \sin \omega t \quad (2)$$

With the values indicated above this gives:

$$I = \frac{12}{2 \cdot 10^3} + \frac{60\sqrt{2}}{1107} \sin wt \quad (3)$$

The values of t for which the current I is zero are given by:

$$t1 = \frac{\text{Arc sin}(-12 \times 1107/2 \times 10^3 \times 60 \times \sqrt{2})}{w} =$$

$$-2.5 \times 10^{-4} \text{ seconds}$$

and $$t2 = \frac{\pi - \text{Arc sin}(-12 \times 1107/2 \times 10^3 \times 60 \times \sqrt{2})}{w} =$$

$$10.25 \times 10^{-3} \text{ seconds}$$

The time interval t2-t1 has a value of $10.5 \times 10^{-3}$ seconds.

The duty ratio in the worst case for a signal at a frequency of 50 Hz is thus:

$$d = 10.5/20, \text{ i.e. } 52.5\%.$$

The best case duty ratio is now calculated, i.e. for the case where the DC impedance $|Zc|$ and the AC impedance $|Za|$ are equal, i.e. the case for which Rt=0. In this case the DC and AC components of the current are proportional to the voltage sources i.e. for the figures given above proportional to 12 volts and to 60 volts. Under these conditions, and retaining the frequency of 50 Hz, the duty ratio is 54.5%.

Known loop detection apparatuses use a voltage signal which is proportional to the line current I, i.e. U=KI. This signal has only an AC component before the telephone is answered since there is no DC and hence no DC component before the subscriber unhooks his telephone. After the telephone has been answered, the voltage signal includes a DC component and an AC component.

The apparatus for detecting a loop during ringing in accordance with the invention detects the passages through zero of the voltage signal U=KI which is proportional to the line current in order to obtain a pulse signal which is constituted by rectangular positive and negative pulses of equal amplitude and whose widths depend on the duty ratio of the voltage signal. The pulse signal is then integrated to obtain a triangular signal which has a positive peak value that increases after the telephone has been answered. The triangular signal is compared with a positive reference voltage to obtain a comparison signal once the triangular signal reaches the said positive reference voltage, this comparison signal is stored and a loop detection signal is delivered based on the stored comparison signal.

Before the telephone is answered, the duty ratio of the line current is 50% and the positive and negative rectangular pulses are of equal width, equal to T/2 where T is the period of the ringing current. After the telephone has been answered, DC flows in the line and the duty ratio is greater than 50%. This causes the positive rectangular pulses to be wider than the negative pulses. After integration the resulting triangular signal includes rising slopes of greater duration than the falling slopes, and thus the value of the positive peak reached at the top of each rising slope increases from one rising slope to the next. The fact of a rising slope in the triangular signal reaching the reference voltage indicates that the subscriber line is looped.

Figure 1:
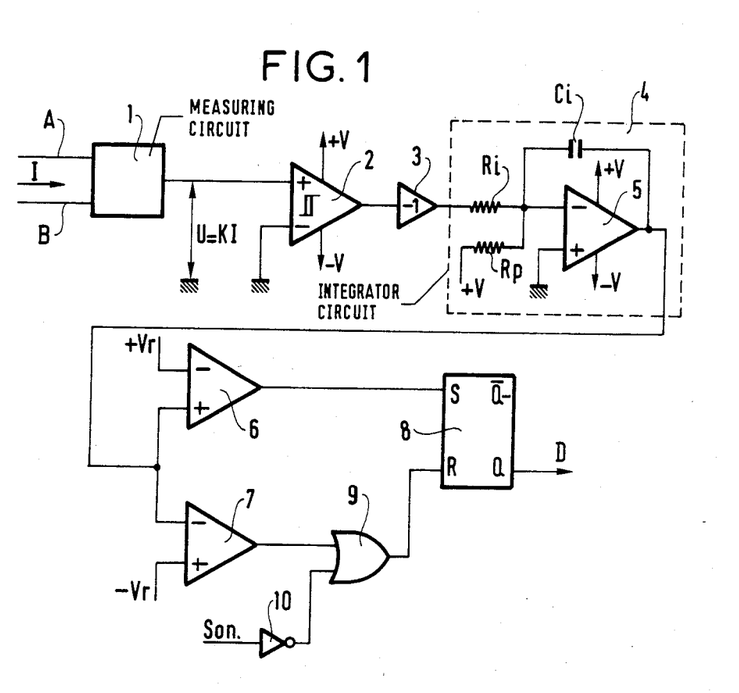
FIG. 1 is a circuit diagram of a first embodiment of the invention.

FIG. 1 shows apparatus for detecting a loop during ringing in accordance with the invention. In this figure the two wires A and B of a subscriber line are connected to a line current measuring circuit 1. The output of the measuring circuit is connected to a positive input of a zero pass detector 2, e.g. a Schmitt trigger, having its negative input connected to ground. The zero pass detector is powered by a DC source providing voltages +V and −V, and its output is connected via an analog inverter 3 to a saturable integrator circuit 4. The integrator circuit is constituted by an amplifier 5 which is powered by the DC source at the voltages +V and −V and which has saturation voltages of +Vsat and −Vsat. A capacitor Ci is connected between a negative input to the amplifier and its output, a resistance Ri connects the analog inverter to the negative input of the amplifier, and a bias resistor Rp connects the negative input of the amplifier to a positive voltage +V. The output of the amplifier 5 is connected to a positive input of a first comparator 6 and to a negative input of a second comparator 7. The first compartor 6 has a negative input connected to a reference voltage +Vr equal to or less than the saturation voltage +Vsat, and its output is connected to a signal input S of an RS type bistable logic device 8. The second comparator 7 has a positive input connected to a negative reference voltage −Vr. The voltages +V and −V and the voltages +Vr and −Vr are symmetrical about ground voltage. The output of the second comparator 7 is connected to one input of an OR gate 9 whose output is connected to the reset to zero input R of the bistable logic device 8. A logic signal Son is applied to the other input of the OR gate via a logical inverter 10. The Q output of the bistable logic device 8 delivers a loop detection signal D.

Figure 2:
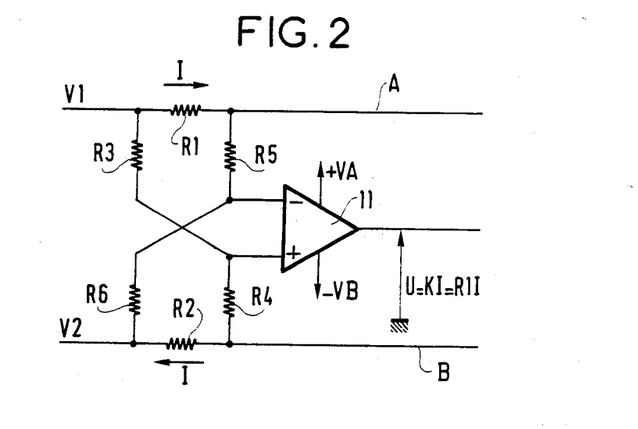
FIG. 2 is a diagram of a circuit for measuring line current as used in the FIG. 1 embodiment.

The measuring circuit 1 in FIG. 1 which delivers a voltage U=KI proportional to the current in the subscriber line is of any known type. For example it may be constituted by two equal value resistances R1 and R2 connected in series in the A and B wires respectively. The potentials V1 and V2 to which the resistances R1 and R2 are respectively connected are the potentials at the terminals of the DC power supply serving to supply power to the subscriber line. The A wire is connected to the potential V2 via two resistances R5 and R6 connected in series. The B wire is connected to potential V1 via two resistances R3 and R4 connected in series. The resistances R3, R4, R5 and R6 are of equal value. The point common to the resistances R5 and R6 is connected to the negative input of an amplifier 11 while the point common to the resistances R3 and R4 is connected to a positive input of the amplifier 11 which is itself powered by a DC source providing potentials +VA and −VB. Since the line current I flows through the resistances R1 and R2, the amplifier 11 delivers an output voltage U=R1.I given that R1 and R2 are of equal value. For an electronic junctor, the subscriber line is powered from a DC source at a voltage of 12 volts. The potentials V1 and +VA are equal to +6 volts and the potentials V2 and −VB are equal to −6 volts.

The operation of the loop detector apparatus shown in FIG. 1 is now examined, beginning with an explanation of the function of the bias resistor Rp connected to the negative input of the amplifier 5.

Given that there may be a leakage current if in the line during ringing, the duty ratio may be slightly different from 50% before answering. Let $|Z1|$ be the modulus of the AC impedance of the line before the telephone is answered, the current I in the line is then given by the equation:

$$I = if + \frac{Va}{|Z1|} \sin wt \qquad (4)$$

where $|Z1| = \sqrt{(RL + Rs)^2 + \frac{1}{Cs^2 w^2}}$

Using the values given above, i.e. RL=0, Rs=1000 ohms and Cs=2 microfarads, $|Z1|$=1880 ohms.

When the line is powered with 48 volts, the leakage current if may be as much as 2.5 mA; for an electronic junctor supplying the line with 12 volts, the leakage current may be 0.625 mA. Putting these values into equation (4) we have:

$$I = 0.625 \times 10^{-3} + \frac{60\sqrt{2}}{1880} \sin wt$$

With values t giving zero current I:

$$t'1 = \frac{-\text{Arc} \sin(-0.625 \times 10^{-3} \times 1880/60 \sqrt{2})}{w}$$

and $$t'2 = \frac{\pi - \text{Arc} \sin(-0.625 \times 10^{-3} \times 1880/60 \sqrt{2})}{w}$$

which for a frequency of 50 Hz gives a duty ratio D1=50.45%.

The zero pass detector 2 delivers a pulse signal constituted by rectangular positive and negative pulses of amplitude +V and −V, of equal width T/2 before answering and in the absence of any leakage, i.e. when the duty ratio of the line current is equal to 50%. In the presence of leakage current, the duty ratio d1 is greater than 50% and the result is that the pulse signal has a bias, i.e. an average asymmetry in time, which will give an average current ie in the resistance Ri equal to:

$$ie = \frac{V.T1}{T.Ri} - \frac{V.T2}{T.Ri} \qquad (5)$$

in which T1 and T2 are the durations of the positive and negative pulses respectively. The duty ratio D1 is defined by T1/T, and since T1+T2=T: T2=T−T1=T(1−d1).

Equation (5) thus becomes:

$$ie = \frac{V \times (D1 - 1 + d1)}{Ri} = \frac{V \times (2\,d1 - 1)}{Ri} \qquad (6)$$

Using the duty ratio d1 calculated above, d1=50.45%, the average current ie is equal to:

$$\frac{V \times 9 \times 10^{-3}}{Ri}$$

The role of the bias resistance Rp is to compensate for the average current ie. In the example shown in FIG. 1, the bias resistance Rp is connected to the potential +V, which gives $$Rp = \frac{V}{ie} = \frac{Ri}{9 \times 10 \times ^{-3}} \qquad (7)$$

Now that the role of the bias resistance Rp has been explained, the operation of the apparatus shown in FIG. 1 is as follows:

Before answering, the voltage signal U=KI delivered by the measuring circuit 1 is applied to the zero pass detector 2 which delivers the rectangular pulses of amplitude +V and −V and of duration T/2 in the absence of any leakage current or of duration T1 and T2 if there is leakage from the line. After being inverted by the analog inverter 3, these pulses are applied to the integrator circuit 4 which delivers a triangular signal. The presence of the analog inverter is required because the integrator circuit inverts the signals which are applied thereto. Thus the analog inverter 3 ensures that the rising slopes of the triangular signal correspond to positive pulses delivered by the zero pass detector and that the falling slopes correspond to the negative pulses. These positive and negative pulses themselves correspond respectively to the positive and negative half cycles of the ringing current and hence of the line current.

Figure 4:
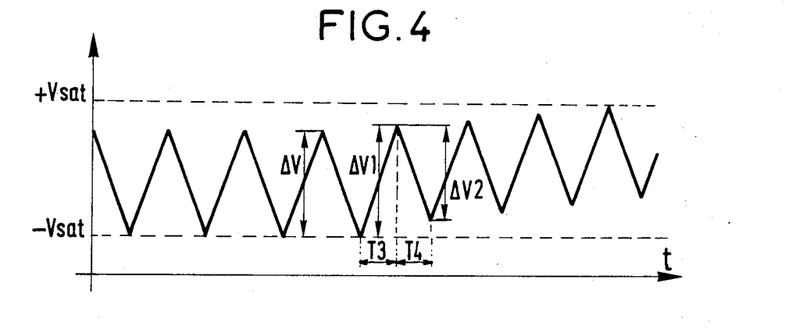
FIG. 4 is a waveform diagram of a triangular signal delivered by an integrator circuit in FIGS. 1 and 3.

The amplifier 5 of the integrator circuit 4 operates in practice between two limit voltages +Vsat and −Vsat since if a constant signal is applied to the input, the output signal cannot increase indefinitely. These two limit voltages are the saturation voltages of the amplifier and they are equal to or less than the voltages +V and −V. The DC current flowing through the bias resistor Rp brings the amplifier to its negative voltage −Vsat in the absence of any other signal. When the zero pass detector delivers a rectangular signal, the integrator circuit 4 delivers a triangular signal such as the signal shown in FIG. 4. To the left of the figure, the triangular signal corresponds to a ringing current before the line is answered. It can also be seen on this figure that the amplitude of the rising slopes remains less than the saturation voltage +Vsat of the amplifier 5. In FIG. 4 it is supposed that the saturation voltages +Vsat and −Vsat of the amplifier 5 are different from its supply voltages +V and −V.

The triangular signal delivered by the integrator circuit 4 is applied to the positive input of the first comparator 6, which so long as the triangular signal remains below the positive reference voltage +Vr, does not deliver any signal to the input S of the bistable logic device 8. The bistable logic device 8 may be constituted, for example, by two NOR gates to give the following truth table: When S=1 and R=0, Q=1 where Q corresponds to the output from the NOR gate which has R as an input. When S=0 and R=1, Q=0.
When R=S=0, Q does not change.
When R=S=1, Q is undetermined.

Consequently, before answering, the detection signal D on the Q output of the bistable 8 has a zero value while S=0 and R=0.

The condition R=0 is obtained from the signal Son which is of logic value 1 when ringing current is being applied to the line and of logic value 0 when ringing current is not being applied. The signal Son is inverted by the inverter 10 before being applied to the OR gate 9, whereby the OR gate delivers a signal of value 0 to the input R of the bistable when the signal Son is at value 1.

After the line has been answered, the line current I includes a DC component and an AC component and the duty ratio of the AC component is other than 50%. It has been shown that this ratio would be 52.5% in the worst case. The voltage signal U=KI delivered by the measuring circuit 1 thus includes a DC component and an AC component whereby the duration of the rectangular pulses delivered by the zero pass detector 2 is no longer T/2, with the duration T3 of the positive rectangular pulses being greater than T/2 and the duration T/4 of the negative rectangular pulses being less than T/2. Consequently, at the output of the integrator 4 the rising slopes of the triangular signal have a duration T3 while the falling slopes have a duration T4 as shown to the right of FIG. 4. Putting the slope of the triangular signal as dV/dt, which slope is determined by the ratio V/RiCi since the rectangular pulses applied to the integrator are of a fixed amplitude V, the amplitudes $\Delta V$ of the rising slopes and the falling slopes which were respectively equal to aT/2 and $-$aT/2 before the line was answered now become:

$\Delta V1 = aT3$ for the rising slopes, and $\Delta V2 = -aT4 = -a(T-T3)$ for the falling slopes where T is the period of the ringing current.

We thus have $\Delta V1 + \Delta V2 = 2aT3 - aT$; and putting the duty ratio T3/T equal to d, we have $\Delta V1 + \Delta V2 = aT(2d-1)$. If the ratio $$\frac{\Delta V1 + \Delta V2}{\Delta V}$$

is calculated its value is:

$$\frac{\Delta V1 + \Delta V2}{\Delta V} = \frac{aT(2d-1)}{aT/2} = 2(2d-1) \quad (8)$$

This ratio represents the amount of increase in the triangular signal during each period. In the worst case indicated above where d=52.5% this increase is 2 (1.05−1)=0.1 or 10% per period.

It can be seen on the right-hand side of FIG. 4 that the rising slopes reach the saturation $+$Vsat to leave flat portions between the rising slopes and the falling slopes. It can also be seen that the falling slopes no longer reach the voltage $-$Vsat. The triangular signal delivered by the integrator circuit 4 is applied to the positive input of the first comparator 6, and when the positive amplitude of the triangular signal reaches the positive reference voltage $+$Vr the first comparator delivers a comparison signal of value 1 to the S input of the bistable logic device 8. The Q output of the bistable logic device changes to 1 thereby providing a loop detection signal D. When the triangular signal subsequently takes a lower value than the positive reference voltage $+$Vr, during the subsequent falling slope, the first comparator 6 delivers a comparison signal of value 0, but this does not change the Q output of the bistable logic device 8. The bistable logic device thus retains the state it took up when the triangular signal reached the positive reference voltage $+$Vr. It can thus be said that the bistable logic device stores the fact that the triangular signal was equal to the positive reference voltage $+$Vr, since the Q output will not change state when the S input returns to the zero state unless the state of its R input becomes a 1, i.e. if the signal Son takes the value 1, which will only happen after ringing current is no longer applied to the line.

In the loop detection apparatus, the triangular signal after the line has been answered thus has an increasing maximum positive value, but this value cannot increase indefinitely. It is limited by the capabilities of the amplifier 5. In FIG. 4 it has been supposed that the limit was the saturation voltage $+$Vsat$<+$V, where $+$V is the supply voltage to the amplifier, such that as soon as saturation is reached a flat portion is observed between the rising slopes and the falling slopes of the triangular signal. In practice, the positive and negative saturation voltages $+$Vsat and $-$Vsat are equal to $+$V and $-$V and the reference voltages $+$Vr and $-$Vr are equal to $+$Vsat and $-$Vsat. It will be observed that the loop detector apparatus will also operate with reference voltages which are less than the saturation voltages of the amplifier. However, the references voltages must not be too small since that would lead to a time constant RiCi which is too large. Since the rising and falling slopes have a value of $+$V/RiCi and $-$V/RiCi, where $+$V is the positive supply voltage to the zero pass detector and is equal for convenience to the power supply voltage to the amplifier 5. The amplitudes of the rising slopes and the falling slopes before the telephone is answered are thus equal to $$\frac{+V \, T}{2TiCi} \text{ and } \frac{-V \, T}{2RiCi},$$

where T is the period of the ringing current.

It is thus necessary that the reference voltages $+$Vr and $-$Vr should be greater than these values which are themselves small for large time constant RiCi and vice versa.

A loop is detected during ringing when the triangular signal reaches a value equal to the positive reference voltage $+$Vsat during a rising slope. There is thus a certain length of time between the instant at which the telephone is answered and the instant at which this voltage equality takes place. Generally speaking, Telephone Administrations require that a loop should be detected during ringing within three or less periods of the ringing current. Equation (8) gives the increase in the triangular signal for each period and it was shown that this increase was 10% in the worst case for loop detection, i.e. the case which corresponds to a duty ratio of 52.5%. To ensure that detection takes place within three periods, in the worst possible case, it is necessary that:

$$V \cdot (1 + 3.10) = Vsat - (-Vsat)$$

i.e. $V = \dfrac{+Vsat - (-Vsat)}{1 + 3/10}$

It has been shown that the slopes have a constant gradient $a = (|V|/RiCi)$, and that the amplitude $\Delta V$ of the rising slopes before the telephone was answered was:

$$\Delta V = \frac{aT}{2} = \frac{VT}{2RiCi}$$

Thus:

$$\frac{VT}{2RiCi} = \frac{+Vsat - (-Vsat)}{1 + 3/10}$$

-continued $$\text{whence } RiCi = \frac{VT(1 + 3/10)}{2[+Vsat - (-Vsat)]}$$

where RiCi is the integrator time constant of the integrator circuit 4.

Putting +V=10 volts, −V=10 volts and +Vsat=10 volts and −Vsat=10 volts, we get RiCi=6.5 milliseconds, e.g. Ri=1000 ohms and Ci=6.5 microfarads.

Using this value of Ri in equation 7 and giving V=+Vsat, we obtain: Rp=110,000 ohms.

When the duty ratio d in the line current is greater than 52.5%, the saturation voltage +Vsat is reached more quickly since the increase given by (8) is a function of the duty ratio d. Consequently a loop will be detected in less than 3 cycles of the ringing current.

There follows an explanation of the role of the second comparator 7 in FIG. 1. If the line is subjected to external interference of sufficient amplitude to momentarily cancel the line current before the telephone is answered, the resulting duty ratio will be different from 50%, and in certain limiting cases it might be possible to obtain a rising slope which would reach the reference voltage +Vr. This would cause the first comparator 6 to momentarily deliver a comparison signal of value 1 to the input S of the bistable logic device 8 whose output Q will then take the value 1. The bistable logic device will no longer change state since its input R receives a signal of value 0 derived from the signal Son via the OR gate line. Since the value +Vr was reached before the telephone was answered, the second comparator 7 will deliver a comparison signal of value 1 to the OR gate 9 as soon as the triangular signal in FIG. 4 returns to the value −Vsat since −Vr is much greater than −Vsat. The result is that the R input to the bistable logic device takes the value 1 and the Q output returns to the value 0 since its S input is then receiving a signal of value 0.

The second comparator 7 thus periodically delivers a signal of value 1 since the triangular signal before the telephone is answered periodically takes the value −Vsat. In this way the R input to the bistable logic device periodically receives a signal of value 1 which puts the Q output to the value 0 supposing it had switched to the value 1 before the telephone was answered, e.g. following external interference on the line. The second comparator 7 thus has a security function. Naturally, as can be seen on FIG. 4, the second comparator 7 does not deliver a comparison signal equal to 1 after the telephone has been answered since the triangular signal no longer returns to the negative reference voltage −Vr at the bottoms of its falling slopes. The amplitude ΔV2 of a falling slope is less after the telephone has been answered than is the amplitude ΔV1 of a rising slope.

Figure 3:
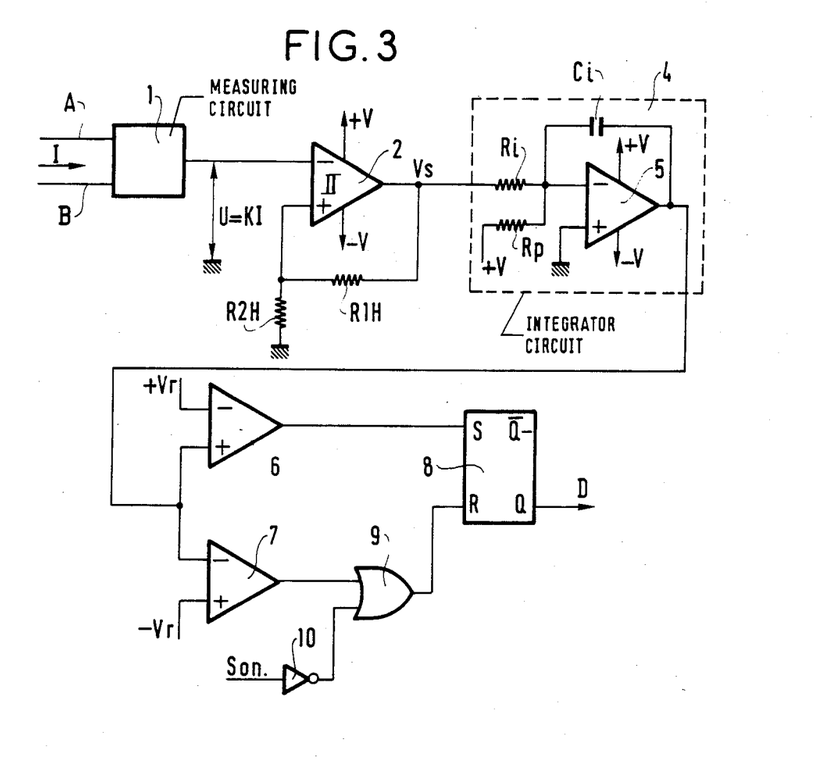
FIG. 3 is a circuit diagram of a second embodiment of the invention.

FIG. 3 shows a variant of the loop detection apparatus of FIG. 1. The same reference designate the same components.

In FIG. 3, the voltage signal U=KI is applied to the negative input of a zero pass detector 2. The rectangular signal delivered by the detector is thus inverted relative to the voltage signal, and consequently the analog inverter 3 shown in FIG. 1 has been removed. This variant could naturally be incorporated into the FIG. 1 circuit without changing its mode of operation, and in practice a loop detection apparatus will use the variant that requires the fewer components.

In FIG. 3, a first hysteresis resistance R1H is connected between the positive input and the output of the zero pass detector, and a second hysteresis resistance R2H is connected between ground and the positive input of the zero detector. There are no other differences between the FIG. 3 embodiment and the FIG. 1 embodiment. Naturally the hysteresis resistances could have been introduced into the FIG. 1 circuit without making any other modification thereto.

There follows a description of the operation of the FIG. 3 circuit.

Figure 5:
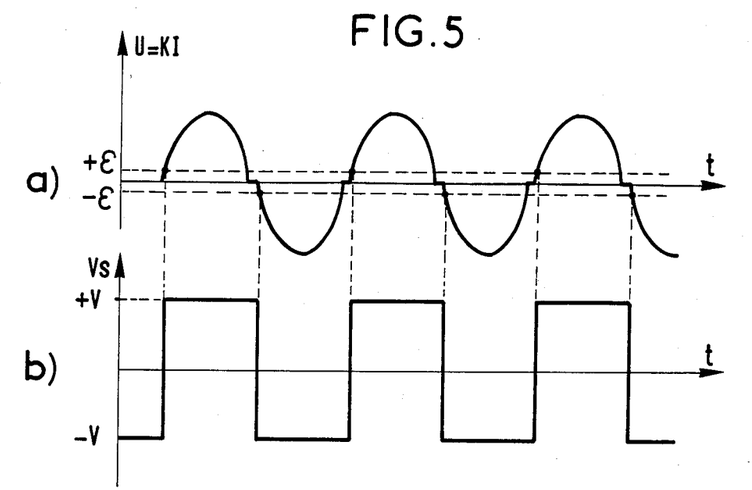
FIGS. 5a and 5b are waveform diagrams showing the voltage at the input and the output of a zero pass detector in FIG. 3 for line current which is not exactly sinusoidal.

The ringing generator applies a voltage of sinusoidal waveform to the line, but the current waveform in the line resulting from the application of said voltage to an electronic telephone is not exactly sinusoidal but includes non negligible flat portions of zero value current between positive and negative half cycles. FIG. 5a shows the waveform of the voltage U=KI applied to the input of the zero pass detector, and FIG. 5b shows the waveform of the rectangular signal delivered by the zero pass detector when it has the waveform shown in FIG. 5a applied thereto, i.e. when the ringing current in the line is not exactly sinusoidal.

If the voltage signal U=KI as shown in FIG. 5a were applied to the zero pass detector of FIG. 1, it would not operate satisfactorily because of the flat portions of zero current. Thus, as indicated in FIG. 3, a hysteresis phenomenon has been introduced by means of the first and second hysteresis resistances R1H and R2H. In this manner, the zero pass detector operates as a comparator having two voltages thresholds $+\epsilon$ for positive current half cycles and $-\epsilon$ for negative half cycles, with the positive input of the detector being alternatively set to a positive threshold voltage $+\epsilon$ and to a negative threshold voltage $-\epsilon$. Before the telephone is answered the positive and negative rectangular pulses delivered by the zero pass detector are of equal duration since the zero pass detector will detect a positive half cycle once the signal has exceeded the threshold $+\epsilon$ and until the signal goes below the threshold $-\epsilon$, and it will detect a negative half cycle from the moment the signal passes the threshold $-\epsilon$ until it reaches the threshold $+\epsilon$. A duty ratio of 50% is thus obtained.

When the telephone is answered, the voltage signal U=KI applied to the input of the zero pass detector has the form U=A+B sin wt.

From equation (2) giving the current, it can be deduced that $$A = \frac{K V_c}{Z_c} \text{ and } B = \frac{K V_a}{|Z_a|}$$

This signal crosses the thresholds $+\epsilon$ and $-\epsilon$ of the zero pass detector at instants:

$$t5 = -\frac{1}{w} \times \text{Arc sin}(A - \epsilon)/B$$

and $$t6 = \frac{\pi}{2} - \frac{1}{w} \times \text{Arc sin}(A + \epsilon) + B$$

$$\Delta t = t6 - t5$$

$$\Delta t = \frac{\pi}{w} + \frac{1}{w} \times \text{Arc sin}\left[\frac{A + B}{\epsilon}\sqrt{1 - \frac{(A - \epsilon)^2}{B^2}} + \right.$$

-continued $$\left. \frac{A-\epsilon}{B} \sqrt{1 - \frac{(A+\epsilon)^2}{B^2}} \right]$$

giving $$\Delta t = \frac{\pi}{w} + \frac{1}{w} \times \text{Arc sin } M,$$

where M represents the expression in braces.
The duty ratio has the value:

$$dH = \frac{1}{2} + \frac{1}{2\pi} \times \text{Arc sin } M.$$

In practice, the threshold values $|\epsilon|$ will be chosen to be equal to 50% of the voltage given by the DC component of the current in the longest expected line. If the longest line has a resistance RL=2000 ohms and DC is applied at 12 volts to supply the line, the line current will be 6 mA, giving $A = K \times 6 \times 10^{-3}$ whence $|\epsilon| = K \times 3 \ 10^{-3}$. Putting K=100 ohms, $|\epsilon|=0.3$ volts. The thresholds are thus $+\epsilon = +0.3$ volts and $-\epsilon = -0.3$ volts. The zero pass detector is powered by voltage $+V=10$ volts and $-V=10$ volts so it delivers rectangular passes of amplitude $+10$ and $-10$ volts. Since the thresholds are $+0.3$ and $-0.3$ volts:
R1H+R2H=10000 ohms with
R1H=9700 ohms and
R2H=300 ohms.

Figure 6:
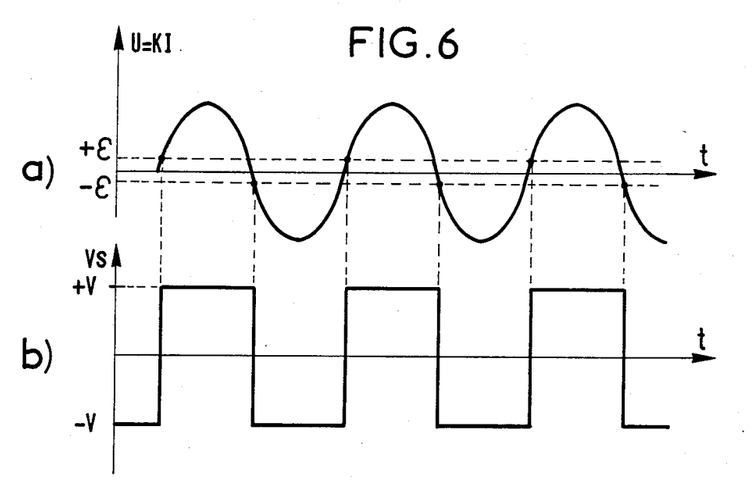
FIGS. 6a and 6b are waveform diagrams at the input and the output of a zero pass detector in FIG. 3 for a sinusoidal line current.

These values improve the duty ratio both in the worst case and in the best case. The apparatus for detecting a loop during ringing as shown in FIG. 3 can naturally be used with a sinusoidal ringing current. FIGS. 6A and 6B show the waveform of the voltage signal and the resulting rectangular pulses to be found at the input and the output of the zero pass detector of FIG. 3 for sinusoidal line current. As before, the zero pass detector operates as a comparator having two thresholds $+\epsilon$ and $-\epsilon$.

The apparatus for detecting a loop during ringing as shown in FIG. 3 provides improved detection in all cases, in particular when the line current is now sinusoidal but has its positive and negative half cycles separated by flat portions of zero current.

The apparatus for detecting a loop in accordance with the invention and can also be used to detect a loop in the presence of line noise, since the corresponding duty ratio in a line of given characteristics hardly changes in the presence of noise provided the amplitude of the noise is less than the amplitude of the line current. It has also been mentioned that the apparatus has very good immunity to external interference of large amplitude but short duration.

The apparatus for detecting a loop during ringing shown in FIG. 3 is as simple as possible since it does not include the analog inverter 3. It is thus the preferred apparatus over the apparatus shown in FIG. 1. As indicated, the hysteresis resistances R1H and R2H are only necessary if the ringing current has flat portions of non negligible duration between positive and negative half cycles, since these flat portions of zero current constitute zones of uncertainty for determining the moment when the current passes through zero, whence there would be risks of improper operation of the zero passage detector and consequently of the loop detection apparatus as a whole.

The apparatus for detecting a loop during ringing in accordance with the invention shown in the figures, uses conventional electronic components. The zero pass detector, the integrator circuit, the comparators, and the RS type bistable logic device may all be made from integrated circuits thereby enabling the loop detector apparatus to be readily included in an electronic junctor.

I claim:

1. Apparatus for detecting a loop during ringing, the apparatus comprising zero pass detector means for detecting zero passes in a voltage signal proportional to the line current and for generating a pulse signal constituted by positive and negative rectangular pulses of equal amplitude and of width dependent on the duty ratio of the line signal, pulse signal processing means responsive to said pulse signal, and storage means for storing a signal delivered by the processing means, the improvement wherein the processing means are constituted by a saturable integrator circuit responsive to said pulse signal for delivering a triangular signal having a positive peak value which increases after ringing has been answered, and a comparator connected to compare the triangular signal with a reference voltage and to deliver a signal to the storage means when a called subscriber answers.

2. Apparatus according to claim 1 for detecting a loop during ringing, wherein the zero pass detector means is constituted by a Schmitt trigger circuit having a positive input connected to ground, a negative input connected to receive a voltage signal proportional to the line current, and an output connected to the saturable integrator circuit, wherein the saturable integrator circuit comprises a timing resistor, a bias resistor, a timing capacitor, and an amplifier, said amplifier having a positive input connected to ground, a negative input connected to the output from the zero pass detector means via said timing resistor and to a positive voltage via said bias resistor, and an output connected to the positive input of said comparator and to one end of said timing capacitor whose other end is connected to the negative input of the amplifier, wherein the storage means is constituted by a bistable logic devices, wherein the comparator has a negative input connected to said reference voltage and an output connected to a signal input of the bistable logic device, wherein the bistable logic device has a reset to zero input connected to receive a zero value signal when a ringing signal is present on the line, and wherein the bistable logic device has an output which delivers the loop detection signal.

3. Apparatus according to claim 2 for detecting a loop during ringing, further comprising hysteresis means connecting said positive input of said zero pass detector means to the output of said zero pass detector means for setting up alternating positive and negative thresholds on said positive input.

4. Apparatus according to claim 2 for detecting a loop during ringing, wherein the processing means comprise a second comparator having a negative input connected to the output of the integrator circuit amplifier, a positive input connected to receive a negative reference voltage, and an output connected via an OR gate to the reset to zero input of the bistable, and wherein the OR gate has an input connected to receive a zero value signal when ringing is present on the line.

5. Apparatus according to claim 3 for detecting a loop during ringing, wherein the processing means comprise a second comparator having a negative input connected to the output of the integrator circuit amplifier, a positive input connected to receive a negative reference voltage, and an output connected via an OR gate to the reset to zero input of the bistable, and wherein the OR gate has an input connected to receive a zero value signal when ringing is present on the line.

6. Apparatus according to claim 3 for detecting a loop during ringing, wherein said hysteresis means comprises a first hysteresis resistor connecting said output of said zero pass detector to said positive input of said zero pass detector, and a second hysteresis resistor connecting said positive input of said zero pass detector to ground.

* * * * *